United States Patent
You

(10) Patent No.: US 12,237,921 B2
(45) Date of Patent: Feb. 25, 2025

(54) METHOD AND APPARATUS FOR RETRANSMISSION USING AGGREGATION FACTOR IN COMMUNICATION NETWORK

(71) Applicant: ELECTRONICS AND TELECOMMUNICATIONS RESEARCH INSTITUTE, Daejeon (KR)

(72) Inventor: Duk Hyun You, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 201 days.

(21) Appl. No.: 17/379,107

(22) Filed: Jul. 19, 2021

(65) Prior Publication Data
US 2022/0045791 A1    Feb. 10, 2022

(30) Foreign Application Priority Data

Aug. 7, 2020  (KR) ........................ 10-2020-0099488
Jul. 16, 2021  (KR) ........................ 10-2021-0093373

(51) Int. Cl.
  *H04L 1/08*    (2006.01)
  *H04L 1/1812*    (2023.01)
  *H04L 1/1867*    (2023.01)

(52) U.S. Cl.
  CPC .............. *H04L 1/08* (2013.01); *H04L 1/1812* (2013.01); *H04L 1/1893* (2013.01)

(58) Field of Classification Search
  CPC ....... H04L 1/08; H04L 1/1812; H04L 1/1893; H04L 1/1854; H04L 1/1864; H04L 1/189; H04L 1/1822
  See application file for complete search history.

(56) References Cited

U.S. PATENT DOCUMENTS

| | | |
|---|---|---|
| 10,798,704 B2 | 10/2020 | Akkarakaran et al. |
| 10,820,338 B2 | 10/2020 | Nogami et al. |
| 2019/0037561 A1 | 1/2019 | Jung et al. |

(Continued)

FOREIGN PATENT DOCUMENTS

WO    2020166878 A1    8/2020

OTHER PUBLICATIONS

3rd Generation Partnership Project; Technical Specification Group Radio Access Network; NR; Physical channels and modulation (Release 16), 3GPP TS 38.211 V16.1.0 (Mar. 2020).

(Continued)

*Primary Examiner* — Gary Mu
*Assistant Examiner* — Yewon Kim
(74) *Attorney, Agent, or Firm* — LRK PATENT LAW FIRM

(57) ABSTRACT

An operation method of a receiving node in a communication system includes: receiving, from a transmitting node, mapping information between transmission parameters and aggregation factors (AFs); receiving, from the transmitting node, control information including a first transmission parameter used for transmission of data among the transmission parameters; determining a first AF mapped to the first transmission parameter from among the AFs based on the mapping information; and performing a repetitive reception operation on the data transmitted from the transmitting node based on the first AF.

15 Claims, 6 Drawing Sheets

(56) References Cited

U.S. PATENT DOCUMENTS

| | | | |
|---|---|---|---|
| 2019/0150164 A1 | 5/2019 | Nam et al. | |
| 2019/0166589 A1* | 5/2019 | Yang | H04L 5/0053 |
| 2019/0230656 A1 | 7/2019 | Soriaga et al. | |
| 2019/0254053 A1* | 8/2019 | Ying | H04L 5/00 |
| 2020/0029323 A1 | 1/2020 | Baldemair et al. | |
| 2020/0146022 A1* | 5/2020 | Hosseini | H04L 5/0048 |
| 2020/0162208 A1 | 5/2020 | Moon et al. | |
| 2020/0235888 A1* | 7/2020 | Yu | H04W 72/23 |
| 2021/0037506 A1* | 2/2021 | Yoshimura | H04L 5/0091 |
| 2021/0385020 A1* | 12/2021 | Määttänen | H04L 1/1893 |
| 2021/0391952 A1* | 12/2021 | Hofström | H04L 1/1864 |

OTHER PUBLICATIONS

3rd Generation Partnership Project; Technical Specification Group Radio Access Network; NR; Multiplexing and channel coding (Release 16), 3GPP TS 38.212 V16.1.0 (Mar. 2020).

3rd Generation Partnership Project; Technical Specification Group Radio Access Network; NR; Physical layer procedures for control (Release 16), 3GPP TS 38.213 V16.1.0 (Mar. 2020).

3rd Generation Partnership Project; Technical Specification Group Radio Access Network; NR; Physical layer procedures for data (Release 16), 3GPP TS 38.214 V16.1.0 (Mar. 2020).

3rd Generation Partnership Project; Technical Specification Group Radio Access Network; NR; Medium Access Control (MAC) protocol specification (Release 16), 3GPP TS 38.321 V16.0.0 (Mar. 2020).

3rd Generation Partnership Project; Technical Specification Group Radio Access Network; NR; Radio Resource Control (RRC) protocol specification (Release 16), 3GPP TS 38.331 V16.0.0 (Mar. 2020).

3rd Generation Partnership Project; Technical Specification Group Radio Access Network; Study on New Radio (NR) to support non-terrestrial networks (Release 15), 3GPP TR 38.811 V15.2.0 (Sep. 2019).

3rd Generation Partnership Project; Technical Specification Group Radio Access Network; Solutions for NR to support hon-terrestrial networks (NTN) (Release 16), 3GPP TR 38.821 V16.0.0 (Dec. 2019).

ETRI, "Discussion on HARQ Enhancements for NTN", 3GPP TSG RAN1 WG1 Meeting #102-e, R1-2006360, e-Meeting, Aug. 17-28, 2020.

CMCC, "Enhancements on HARQ for NTN", 3GPP TSG RAN WG1 #103-e, R1-2008012, e-Meeting, Oct. 26-Nov. 13, 2020.

Lenovo, Motorola Mobility, "Enhancements on HARQ for NTN", 3GPP TSG RAN WG1 Meeting #103e, R1-2008924, e-Meeting, Oct. 19-Nov. 6, 2020.

ETRI, "Discussion on HARQ Enhancements for NTN", 3GPP TSG RAN1 WG1 Meeting #103-e, R1-2009017, e-Meeting, Oct. 26-Nov. 13, 2020.

Ericsson, "On HARQ enhancements for NTN", 3GPP TSG-RAN WG1 Meeting #103-e, R1-2009093, e-Meeting, Oct. 26-Nov. 13, 2020.

ETRI, "Discussion on HARQ Enhancements for NTN", 3GPP TSG RAN1 WG1 Meeting #104-e, R1-2101080, e-Meeting, Jan. 25-Feb. 5, 2021.

ETRI, "Discussion on HARQ Enhancements for NTN", 3GPP TSG RAN1 WG1 Meeting #105-e, R1-2105222, e-Meeting, May 10-May 27, 2021.

ETRI, "Harq aspects in NTN", 3GPP TSG RAN2 WG2 Meeting #112-e, R2-2010533, Online, Nov. 2-13, 2020.

\* cited by examiner

METHOD AND APPARATUS FOR RETRANSMISSION USING AGGREGATION FACTOR IN COMMUNICATION NETWORK

CROSS-REFERENCE TO RELATED APPLICATIONS

This application claims priority to Korean Patent Applications No. 10-2020-0099488 filed on Aug. 7, 2020 and No. 10-2021-0093373 filed on Jul. 16, 2021 with the Korean Intellectual Property Office (KIPO), the entire contents of which are hereby incorporated by reference.

BACKGROUND

1. Technical Field

The present disclosure relates to a retransmission technique in a communication network, and more specifically, to a retransmission technique using an aggregation factor.

2. Description of Related Art

The communication system (hereinafter, new radio (NR) communication system) using a higher frequency band (e.g., a frequency band of 6 GHz or higher) than a frequency band (e.g., a frequency band lower below 6 GHz) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like. Communication technologies are needed to meet requirements of eMBB, URLLC, and mMTC.

The NR communication network may provide communication services to terminals located on the ground. Recently, as well as on the ground, demands for communication services for airplanes, drones, satellites, etc. not located on the ground are increasing, and for this purpose, technologies for a non-terrestrial network (NTN) are being discussed. The non-terrestrial network (NTN) may be implemented based on the NR technology. For example, in a non-terrestrial network, communications between a satellite and a communication node located on the ground (e.g., user equipment (UE)) or a communication node not located on the ground (e.g., airplane, drone) may be performed based on the NR technology. In the non-terrestrial network, a satellite may perform functions of a base station in the NR communication network.

On the other hand, in a communication network (e.g., LTE communication network, NR communication network, or non-terrestrial network), data may be transmitted based on a blind retransmission scheme. In this case, the same data may be repeatedly transmitted a plurality of times according to an aggregation factor. Since the aggregation factor is fixed to one value by radio resource control (RRC) signaling, it may be difficult to dynamically change the aggregation factor according to a communication environment. Accordingly, the performance of the communication network may be degraded.

SUMMARY

Accordingly, exemplary embodiments of the present disclosure are directed to providing a method and an apparatus for retransmission using a dynamic aggregation factor.

According to a first exemplary embodiment of the present disclosure, an operation method of a receiving node in a communication system may comprise: receiving, from a transmitting node, mapping information between transmission parameters and aggregation factors (AFs); receiving, from the transmitting node, control information including a first transmission parameter used for transmission of data among the transmission parameters; determining a first AF mapped to the first transmission parameter from among the AFs based on the mapping information; and performing a repetitive reception operation on the data transmitted from the transmitting node based on the first AF.

The mapping information may be a modulation and coding scheme (MCS)-AF mapping table, the first transmission parameter may be one MCS index in the MCS-AF mapping table, and the first AF may be mapped to the one MCS index.

The mapping information may be a hybrid automatic repeat request (HARQ)-AF mapping table, the first transmission parameter may be one HARQ feedback configuration in the HARQ-AF mapping table, the first AF may be mapped to the one HARQ feedback configuration, and the one HARQ feedback configuration may be a HARQ feedback enabled mode or a HARQ feedback disabled mode.

The mapping information may be a HARQ process number (HPN)-AF mapping table, the first transmission parameter may be one HPN in the HPN-AF mapping table, and the first AF may be mapped to the one HPN.

The operation method may further comprise receiving a message including information indicating whether to use the mapping information from the transmitting node.

When the message indicates use of the mapping information, the first AF may be determined based on the mapping information.

The mapping information may be received through at least one of a physical (PHY) message, a medium access control (MAC) message, and a radio resource control (RRC) message.

According to a second exemplary embodiment of the present disclosure, an operation method of a transmitting node in a communication system may comprise: transmitting, to a receiving node, mapping information between transmission parameters and aggregation factors (AFs); determining a first transmission parameter used for transmission of data among the transmission parameters; transmitting control information including the first transmission parameter to the receiving node; and repeatedly transmitting the data to the receiving node based on a first AF mapped to the first transmission parameter among the AFs.

The mapping information may be a modulation and coding scheme (MCS)-AF mapping table, the first transmission parameter may be one MCS index in the MCS-AF mapping table, and the first AF may be mapped to the one MCS index.

The mapping information may be a hybrid automatic repeat request (HARQ)-AF mapping table, the first transmission parameter may be one HARQ feedback configuration in the HARQ-AF mapping table, the first AF may be mapped to the one HARQ feedback configuration, and the one HARQ feedback configuration may be a HARQ feedback enabled mode or a HARQ feedback disabled mode.

The mapping information may be a HARQ process number (HPN)-AF mapping table, the first transmission parameter may be one HPN in the HPN-AF mapping table, and the first AF may be mapped to the one HPN.

The operation method may further comprise determining the first AF used for transmission of the data, wherein the first transmission parameter may be a transmission parameter mapped to the first AF among the transmission parameters.

The operation method may further comprise transmitting a message including information indicating whether to use the mapping information to the receiving node.

The mapping information may be transmitted through at least one of a physical (PHY) message, a medium access control (MAC) message, and a radio resource control (RRC) message.

According to a third exemplary embodiment of the present disclosure, a receiving node may comprise a processor, a memory electronically communicating with the processor, and instructions executable by the processor. In addition, when executed by the processor, the instructions may cause the receiving node to: receive, from a transmitting node, mapping information between transmission parameters and aggregation factors (AFs); receive, from the transmitting node, control information including a first transmission parameter used for transmission of data among the transmission parameters; determine a first AF mapped to the first transmission parameter from among the AFs based on the mapping information; and perform a repetitive reception operation on the data transmitted from the transmitting node based on the first AF.

The mapping information may be a search space (SS)-AF mapping table, the first transmission parameter may be one search space type in the SS-AF mapping table, and the control information may be received in the one search space type.

The mapping information may be a radio network temporary identifier (RNTI)-AF mapping table, the first transmission parameter may be one RNTI in the RNTI-AF mapping table, and the control information may be scrambled by the one RNTI.

The instructions may further cause the receiving node to receive a message including information indicating whether to use the mapping information from the transmitting node.

When the message indicates use of the mapping information, the first AF may be determined based on the mapping information.

The mapping information may be received through at least one of a physical (PHY) message, a medium access control (MAC) message, and a radio resource control (RRC) message.

According to the exemplary embodiments of the present disclosure, an aggregation factor (AF) may be dynamically determined in a blind retransmission procedure. An appropriate AF may be determined according to a relationship between a throughput and a reliability, and the blind retransmission procedure may be performed based on the determined AF. Accordingly, a decrease in the throughput and/or a decrease in the reliability can be prevented, and the performance of the communication system can be improved.

DETAILED DESCRIPTION OF THE EMBODIMENTS

Figure 1:
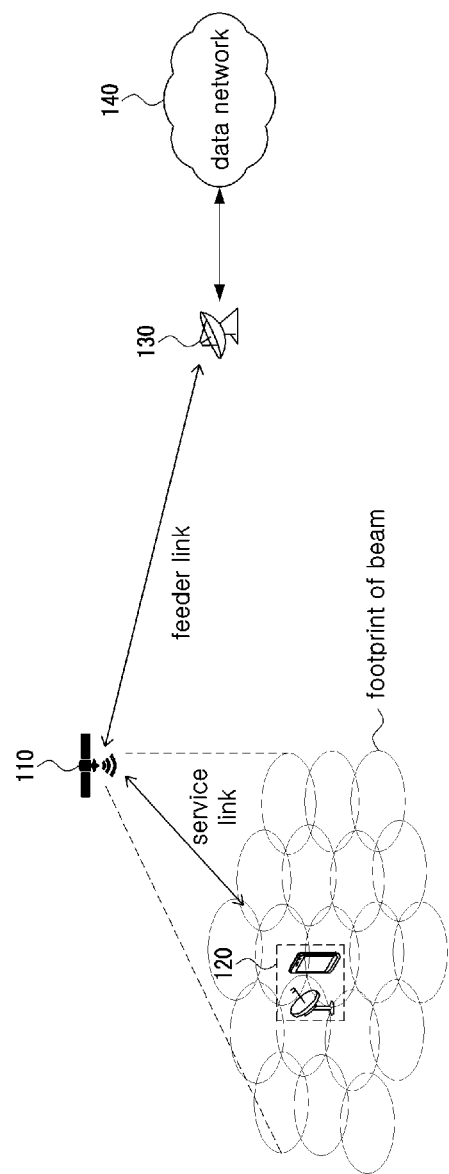
FIG. 1 is a conceptual diagram illustrating a first exemplary embodiment of a non-terrestrial network.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication network to which exemplary embodiments according to the present disclosure are applied will be described. The communication system may be a non-terrestrial network (NTN), a 4G communication network (e.g., long-term evolution (LTE) communication network), a 5G communication network (e.g., new radio (NR) communication network), and/or the like. The 4G communication network and the 5G communication network may be classified as terrestrial networks.

The non-terrestrial network may operate based on the LTE technology and/or NR technology. The non-terrestrial network may support communication in a frequency band of 6 GHz or above as well as a frequency band of 6 GHz or below. The 4G communication network may support communication in a frequency band of 6 GHz or below. The 5G communication network may support communication not only in a frequency band of 6 GHz or below, but also in a frequency band of 6 GHz or above. The communication network to which exemplary embodiments according to the present disclosure are applied is not limited to the contents described below, and the exemplary embodiments according to the present disclosure may be applied to various communication networks. Here, the communication network may be used in the same meaning as a communication system.

FIG. 1 is a conceptual diagram illustrating a first exemplary embodiment of a non-terrestrial network.

Referring to FIG. 1, the non-terrestrial network may include a satellite 110, a communication node 120, a gateway 130, a data network 140, and the like. The non-terrestrial network shown in FIG. 1 may be a transparent payload-based non-terrestrial network. The satellite 110 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 120 may include a communication node located on the ground (e.g., user equipment (UE), terminal) and a communication node not located on the ground (e.g., airplane, drone). A service link may be established between the satellite 110 and the communication node 120, and the service link may be a radio link. The satellite 110 may provide communication services to the communication node 120 using one or more beams. A shape of a footprint of the beam of the satellite 110 may be elliptical.

The communication node 120 may perform communications (e.g., downlink communication, uplink communication) with the satellite 110 using the LTE technology and/or NR technology. The communications between the satellite 110 and the communication node 120 may be performed using an NR-Uu interface. If dual connectivity (DC) is supported, the communication node 120 may be connected to the satellite 110 as well as another base station (e.g., base station supporting the LTE and/or NR functions), and may perform DC operations based on the technology defined in the LTE and/or NR specifications.

The gateway 130 may be located on the ground, and a feeder link may be established between the satellite 110 and the gateway 130. The feeder link may be a radio link. The gateway 130 may be referred to as a 'non-terrestrial network (NTN) gateway'. Communications between the satellite 110 and the gateway 130 may be performed based on an NR-Uu interface or a satellite radio interface (SRI). The gateway 130 may be connected to the data network 140. A 'core network' may exist between the gateway 130 and the data network 140. In this case, the gateway 130 may be connected to the core network, and the core network may be connected to the data network 140. The core network may support the NR technology. For example, the core network may include an access and mobility management function (AMF), a user plane function (UPF), a session management function (SMF), and the like. Communications between the gateway 130 and the core network may be performed based on an NG-C/U interface.

Alternatively, a base station and the core network may exist between the gateway 130 and the data network 140. In this case, the gateway 130 may be connected to the base station, the base station may be connected to the core network, and the core network may be connected to the data network 140. The base station and core network may support the NR technology. Communications between the gateway 130 and the base station may be performed based on an NR-Uu interface, and communications between the base station and the core network (e.g., AMF, UPF, SMF) may be performed based on an NG-C/U interface.

Figure 2:
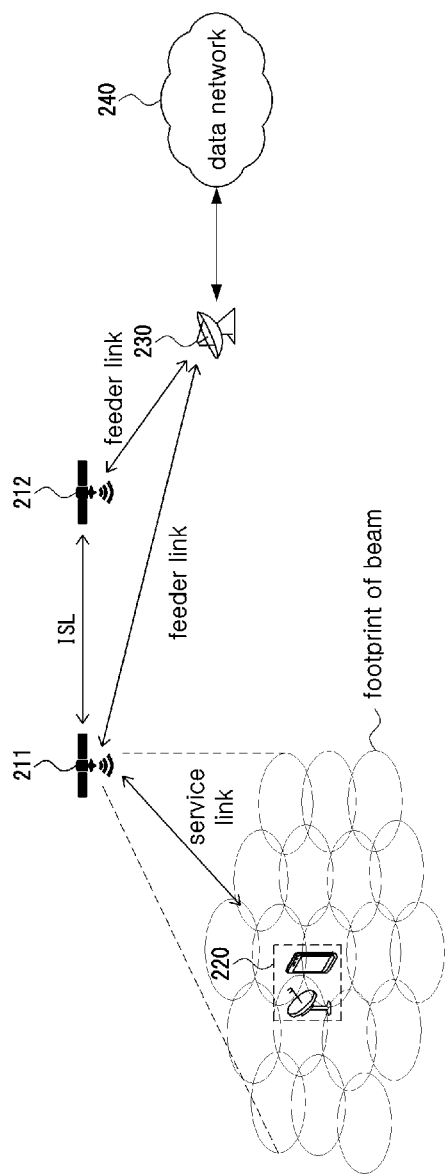
FIG. 2 is a conceptual diagram illustrating a second exemplary embodiment of a non-terrestrial network.

FIG. 2 is a conceptual diagram illustrating a second exemplary embodiment of a non-terrestrial network.

Referring to FIG. 2, the non-terrestrial network may include a satellite #1 211, a satellite #2 212, a communication node 220, a gateway 230, a data network 240, and the like. The non-terrestrial network shown in FIG. 2 may be a regenerative payload-based non-terrestrial network. For example, each of the satellites #1 and #2 may perform a regeneration operation (e.g., demodulation operation, decoding operation, re-encoding operation, re-modulation operation, and/or filtering operation) for a payload received from another entity (e.g., communication node 220, gateway 230) constituting the non-terrestrial network, and transmit the regenerated payload.

Each of the satellites #1 and #2 may be a LEO satellite, a MEO satellite, a GEO satellite, a HEO satellite, or a UAS platform. The UAS platform may include a HAPS. The satellite #1 may be connected to the satellite #2, and an inter-satellite link (ISL) may be established between the satellite #1 and the satellite #2. The ISL may operate in a radio frequency (RF) or optical band. The ISL may be optional. The communication node 220 may include a communication node located on the ground (e.g., UE, terminal) and a communication node not located on the ground (e.g., airplane, drone). A service link (e.g., radio link) may be established between the satellite #1 and the communication node 220. The satellite #1 may provide communication services to the communication node 220 using one or more beams.

The communication node 220 may perform communications (e.g., downlink communication, uplink communication) with the satellite #1 211 using the LTE technology and/or NR technology. The communications between satellite #1 211 and the communication node 220 may be performed using an NR-Uu interface. If DC is supported, the communication node 220 may be connected to the satellite #1 as well as another base station (e.g., base station supporting the LTE and/or NR functions), and perform DC operations based on the technology defined in the LTE and/or NR specifications.

The gateway 230 may be located on the ground, and a feeder link may be established between the satellite #1 and the gateway 230, and a feeder link may be established between the satellite #2 and the gateway 230. The feeder link may be a radio link. When an ISL is not established between the satellite #1 and the satellite #2, the feeder link between the satellite #1 and the gateway 230 may be mandatory.

Communications between each of the satellites #1 and #2 and the gateway 230 may be performed based on an NR-Uu interface or SRI. The gateway 230 may be connected to the data network 240. A 'core network' may exist between the gateway 230 and the data network 240. In this case, the gateway 230 may be connected to the core network, and the core network may be connected to the data network 240. The core network may support the NR technology. For example, the core network may include an AMF, UPF, SMF, and the like. Communications between the gateway 230 and the core network may be performed based on an NG-C/U interface.

Alternatively, a base station and the core network may exist between the gateway 230 and the data network 240. In this case, the gateway 230 may be connected to the base station, the base station may be connected to the core network, and the core network may be connected to the data network 240. The base station and core network may support the NR technology. Communications between the gateway 230 and the base station may be performed based on an NR-Uu interface, and communications between the base station and the core network (e.g., AMF, UPF, SMF) may be performed based on an NG-C/U interface.

Meanwhile, the entities (e.g., satellites, communication nodes, gateways, etc.) constituting the non-terrestrial network shown in FIGS. 1 and 2 may be configured as follows.

Figure 3:
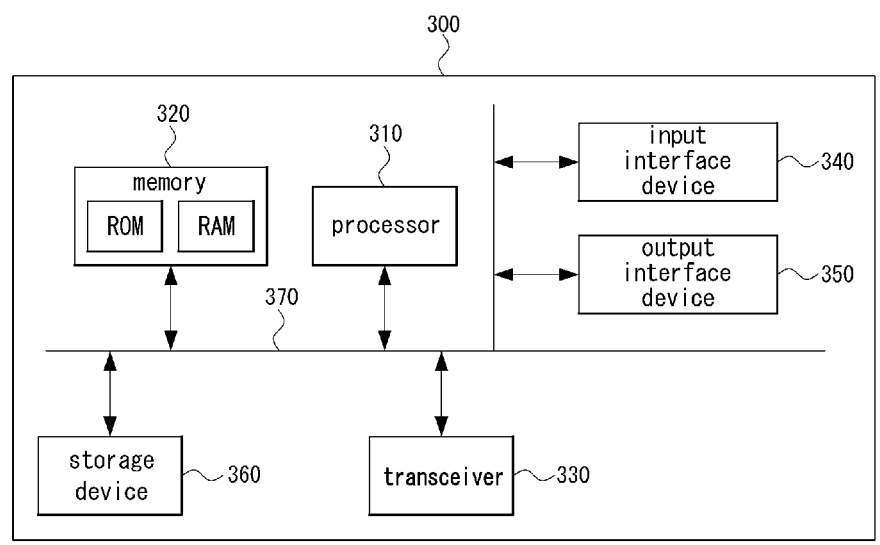
FIG. 3 is a block diagram illustrating a first exemplary embodiment of an entity constituting a non-terrestrial network.

FIG. 3 is a block diagram illustrating a first exemplary embodiment of an entity constituting a non-terrestrial network.

Referring to FIG. 3, an entity 300 may comprise at least one processor 310, a memory 320, and a transceiver 330 connected to the network for performing communications. Also, the entity 300 may further comprise an input interface device 340, an output interface device 350, a storage device 360, and the like. Each component included in the entity 300 may communicate with each other as connected through a bus 370.

However, each of the components included in the entity 300 may be connected not to the common bus 370 but to the processor 310 through an individual interface or an individual bus. For example, the processor 310 may be connected to at least one of the memory 320, the transceiver 330, the input interface device 340, the output interface device 350, and the storage device 360 through dedicated interfaces.

The processor 310 may execute a program stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may be constituted by at least one of a volatile storage medium and a non-volatile storage medium. For example, the memory 320 may comprise at least one of read-only memory (ROM) and random access memory (RAM).

Meanwhile, scenarios in the non-terrestrial network may be defined as shown in Table 1 below.

TABLE 1

|  | NTN shown in FIG. 1 | NTN shown in FIG. 2 |
| --- | --- | --- |
| GEO | Scenario A | Scenario B |
| LEO (steerable beam) | Scenario C1 | Scenario D1 |
| LEO (beam moving with satellite) | Scenario C2 | Scenario D2 |

When the satellite 110 in the non-terrestrial network shown in FIG. 1 is a GEO satellite (e.g., GEO satellite supporting a transparent function), this may be referred to as a 'scenario A'. When the satellites #1 and #2 in the non-terrestrial network shown in FIG. 2 are GEO satellites (e.g., GEO satellites supporting a regenerative function), this may be referred to as a 'scenario B'.

When the satellite 110 in the non-terrestrial network shown in FIG. 1 is an LEO satellite with steerable beams, this may be referred to as a 'scenario C1'. When the satellite 110 in the non-terrestrial network shown in FIG. 1 is an LEO satellite with beams moving with the satellite, this may be referred to as a 'scenario C2'. When satellites 211 and 212 in the non-terrestrial network shown in FIG. 2 are LEO satellites with steerable beams, this may be referred to as a 'scenario D1'. When the satellites 211 and 212 in the non-terrestrial network shown in FIG. 2 are LEO satellites having beams moving with the satellites, this may be referred to as a 'scenario D2'.

Parameters for the scenarios defined in Table 1 may be defined as shown in Table 2 below.

TABLE 2

|  | Scenarios A and B | Scenarios C and D |
| --- | --- | --- |
| Altitude | 35,786 km | 600 km |
|  |  | 1,200 km |
| Spectrum (service link) | <6 GHz (e.g. 2 GHz) | |
|  | >6 GHz (e.g. DL 20 GHz, UL 30 GHz) | |
| Maximum channel bandwidth capability (service link) | 30 MHz for band <6 GHz | |
|  | 1 GHz for band >6 GHz | |

TABLE 2-continued

|  | Scenarios A and B | Scenarios C and D |
| --- | --- | --- |
| Maximum distance between satellite and communication node (e.g., UE) at a minimum elevation angle | 40,581 km | 1,932 km (at an altitude of 600 km) 3,131 km (at an altitude of 1,200 km) |
| Maximum round trip delay (RTD) (propagation delay only) | Scenarios A: 541.46 ms (service and feeder links) Scenario B: 270.73 ms (service link only) | Scenario C: (transparent payload: service and feeder links) 25.77 ms (at an altitude of 600 km) 41.77 ms (at an altitude of 1,200 km) Scenario D: (regenerative payload: service link only) 12.89 ms (at an altitude of 600 km) 20.89 ms (at an altitude of 1200 km) |
| Maximum differential delay within one cell | 10.3 m | 3.12 ms (at an altitude of 600 km) 3.18 ms (at an altitude of 1200 km) |
| Service link | NR defined in the 3GPP | |
| Feeder link | Radio interface defined in the 3GPP or non-3GPP | |

In addition, in the scenarios defined in Table 1, delay constraints may be defined as shown in Table 3 below.

TABLE 3

|  | Scenario A | Scenario B | Scenario C1-2 | Scenario D1-2 |
| --- | --- | --- | --- | --- |
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Hereinafter, retransmission methods based on a dynamic aggregation factor will be described. Even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

A retransmission method (e.g., retransmission mechanism) may be designed assuming a specific range of round trip time (RTT), and the retransmission method may depend on the RTT. Therefore, when the RTT is changed, a new retransmission method may be required. Referring to the scenarios described in Table 3, an RTT (e.g., round trip delay (RTD)) in the non-terrestrial network may be longer than that in the existing communication network (e.g., LTE communication network, NR communication network). Therefore, for the non-terrestrial network, a new retransmission method tolerable to delay may be required instead of a retransmission method designed according to a relatively short RTT.

A blind retransmission method (e.g., multiple retransmission method) may be used as a new retransmission method. In the blind retransmission method, data may be transmitted in aggregated slot(s) according to a slot aggregation scheme, and a HARQ response (e.g., acknowledgement (ACK) or negative ACK (NACK)) for the corresponding data may not be transmitted.

When the blind retransmission scheme is performed, data (e.g., the same data) may be repeatedly transmitted a preset number of times according to an aggregation factor. The aggregation factor (e.g., pdsch-AggregationFactor and/or pusch-AggregationFactor) may be set by radio resource control (RRC) signaling. The aggregation factor may be set to one of 2, 4, or 8.

Each of physical downlink shared channel (PDSCH) and physical uplink shared channel (PUSCH) may be transmitted in various types according to a change in transmission parameters (e.g., modulation and coding scheme (MCS), aggregation factor, etc.). An aggregation factor (e.g., pdsch-AggregationFactor) for PDSCH transmission may be set, and an aggregation factor (e.g., pusch-AggregationFactor) for PUSCH transmission may be set. A transmission type may be defined according to the transmission parameter(s). Performance (e.g., throughput, error rate, etc.) may vary depending on the transmission type at a specific S(I)NR. In exemplary embodiments, the S(I)NR may refer to a signal to noise ratio (SNR) and/or signal to interference plus noise ratio (SINR). When the aggregation factor, which is a transmission parameter, is fixed to a specific value, it may be difficult to optimize the transmission type. That is, when the aggregation factor is fixed to a specific value, performance may decrease in a transmission type other than a specific transmission type corresponding to the specific aggregation factor.

Figure 4:
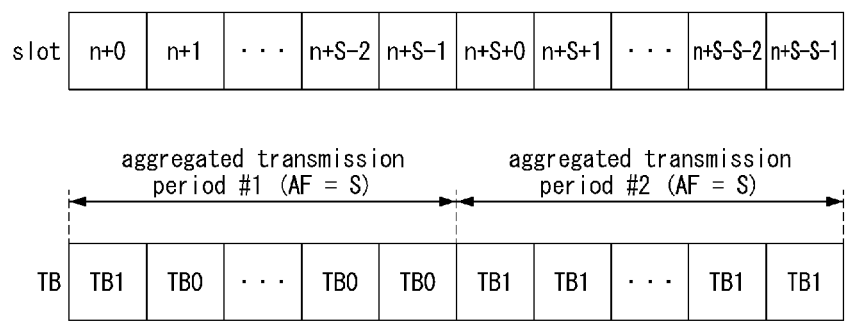
FIG. 4 is a conceptual diagram illustrating a first exemplary embodiment of a blind retransmission method in a communication system.

FIG. 4 is a conceptual diagram illustrating a first exemplary embodiment of a blind retransmission method in a communication system.

Referring to FIG. 4, the blind retransmission method may be performed based on the slot aggregation scheme, and a HARQ-ACK feedback operation may not be performed. A transmitting node may repeatedly transmit the same transport block (TB) (e.g., TB or code block group (CBG) configured with the same data unit) in aggregated slots (e.g., S slots). Here, S may be a natural number. The number of aggregated slots may be indicated by an aggregation factor (AF). The repeated transmissions of the same TB (or the same CBG) may be performed on the AF basis (e.g., aggregated transmission period). In one aggregated transmission period, the same TB may be transmitted more than once, and the same TB including different transmission information may be transmitted in the respective slots.

The transmission information may be changed for each slot in one aggregated transmission period. The transmission information may be information selected from a rate-matched circular buffer. The information selected from the circular buffer may be determined according to a redundancy version (RV). Based on an RV value applied to an initial transmission TB and a transmission order of a current TB in the aggregated transmission period, an RV value applied to the current TB may be determined. The initial transmission TB may be a TB transmitted through the first slot in the aggregated transmission period.

When the slot aggregation scheme is used, HARQ-ACK may be generated based on a result of data decoding (e.g., cyclic redundancy check (CRC) result) performed by the receiving node (e.g., base station or terminal). In this case, the HARQ-ACK may include a decoding result for each of all TBs (or all CBGs) received in the aggregated transmission period. As another example, instead of one TB (or one CBG), one HARQ-ACK may be generated for all TBs (or all CBGs) received in the aggregated transmission period. That is, the HARQ-ACK may be generated on an aggregated transmission period basis. One HARQ-ACK may be generated by bundling decoding results for all TBs received in one aggregated transmission period. For example, when CRC results for all TBs received in one aggregated transmission period are CRC failures, the receiving node may transmit NACK to the transmitting node as the HARQ-ACK. When CRC result(s) for one or more TB(s) received in one aggregated transmission period are CRC OK, the receiving node may transmit ACK to the transmitting node as the HARQ-ACK.

Figure 5:
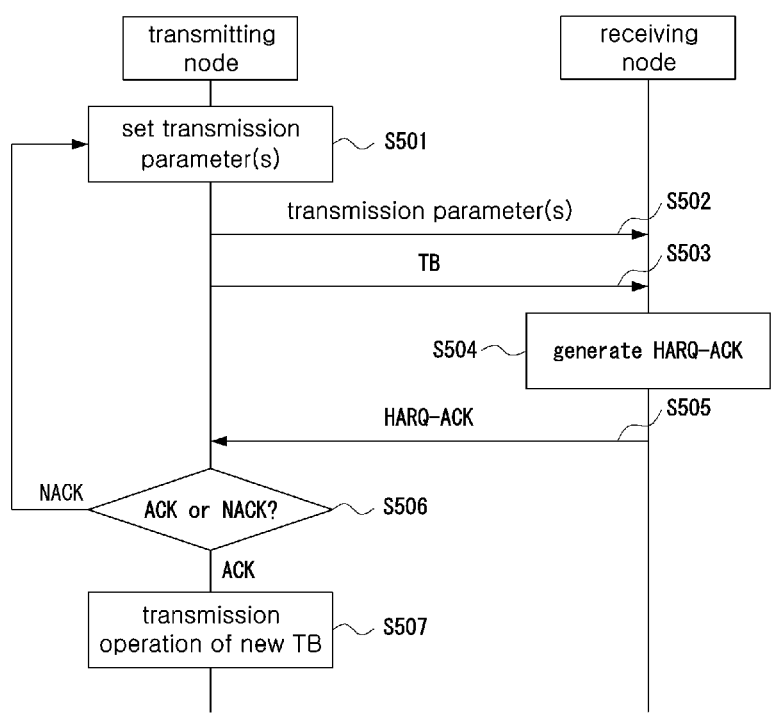
FIG. 5 is a sequence chart illustrating a first exemplary embodiment of a retransmission method in a communication system.

FIG. 5 is a sequence chart illustrating a first exemplary embodiment of a retransmission method in a communication system.

Referring to FIG. 5, the communication system (e.g., LTE communication system, NR communication system, or non-terrestrial network) may include a transmitting node and a receiving node. The transmitting node may be a communication node transmitting data, and the receiving node may be a communication node receiving the data. Each of the transmitting node and the receiving node may be configured identically or similarly to the communication node 300 shown in FIG. 3.

The transmitting node may set transmission parameters (S501). The transmission parameters may include effective code rate related parameter(s) and/or HARQ related parameter(s). The transmitting node may transmit the transmission parameters to the receiving node (S502). The transmission parameters may be transmitted through one or a combination of two or more of system information, a radio resource control (RRC) message, a medium access control (MAC) message, and a physical (PHY) message. The system information may be a master information block (MIB) and/or a system information block (SIB). The MAC message may be a message including a MAC control element (CE). The PHY message may be control information, and the control information may be downlink control information (DCI), uplink control information (UCI), and/or sidelink control information (SCI).

The receiving node may receive the transmission parameters from the transmitting node. The transmitting node may transmit a transport block (TB) to the receiving node based on the transmission parameters (S503). Here, the transmission operation may be performed on a TB basis, and a HARQ-ACK feedback operation may be performed on a TB or CBG basis. The receiving node may perform a reception operation of the TB based on the transmission parameters. For example, the receiving node may generate HARQ-ACK (e.g., ACK or NACK) based on a decoding result of the TB (S504). The receiving node may transmit the HARQ-ACK to the transmitting node (S505).

The transmitting node may receive the HARQ-ACK from the receiving node, and may identify whether the HARQ-ACK is ACK or NACK (S506). If the HARQ-ACK is ACK, the transmitting node may determine that the TB transmitted in the step S503 has been successfully received by the receiving node, and may perform a transmission operation of a new TB (S507). Alternatively, when a new TB does not exist in the transmitting node, the transmission operation of the TB may be terminated.

On the other hand, when the HARQ-ACK is NACK, the transmitting node may reset the transmission parameters by performing the step S501 again, and may perform a retransmission operation of the TB based on the reset transmission parameters. That is, the transmitting node may perform a rate control operation on the retransmission TB based on the HARQ-ACK (e.g., NACK). The transmission parameters for retransmission of the TB may be set differently from the transmission parameters for the initial transmission of the TB.

Figure 6:
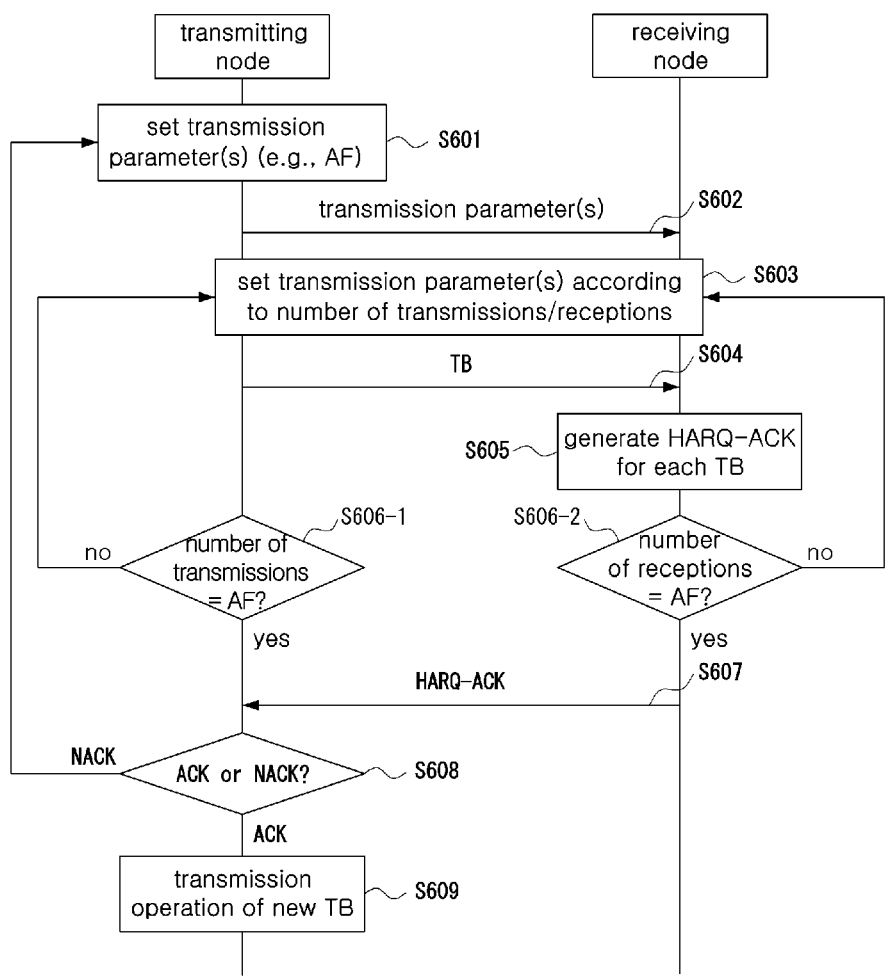
FIG. 6 is a sequence chart illustrating a second exemplary embodiment of a retransmission method in a communication system.

FIG. 6 is a sequence chart illustrating a second exemplary embodiment of a retransmission method in a communication system.

Referring to FIG. 6, the communication system (e.g., LTE communication system, NR communication system, or non-terrestrial network) may include a transmitting node and a receiving node. Each of the transmitting node and the receiving node may be configured identically or similarly to the communication node 300 shown in FIG. 3. The retransmission method shown in FIG. 6 may be performed based on the slot aggregation scheme. The retransmission method based on the slot aggregation scheme may be a blind retransmission method. For example, the same TB (e.g., TB configured with the same data unit) may be repeatedly transmitted in an aggregated transmission period (e.g., slots indicated by an AF). The TBs repeatedly transmitted in one aggregated transmission period may have different RVs.

The transmitting node may set transmission parameters (S601). The transmission parameters may include effective code rate related parameter(s) and/or HARQ related parameter(s). For example, the transmitting node may set an AF. The AF may be included in the transmission parameters. The transmitting node may transmit the transmission parameters to the receiving node (S602). The transmission parameters may be transmitted through one or a combination of two or more of system information, an RRC message, a MAC message, and a PHY message. The receiving node may receive the transmission parameters. The transmission parameters (e.g., RV) may be set (e.g., updated) according to the number of transmissions or receptions of the TB (S603). For example, the transmitting node may set the transmission parameters according to the number of transmissions of the TB within one aggregated transmission period, and the receiving node may set the transmission parameters according to the number of receptions of the TB within one aggregated transmission period.

The transmitting node may transmit the TB to the receiving node based on the transmission parameters (S604). The transmitting node may repeatedly transmit the TB as many times as the AF within the aggregated transmission period. For example, the transmitting node may compare the number of transmissions of the TB within the aggregated transmission period and the AF (S606-1). If the number of transmissions of the TB within the aggregated transmission period is less than AF, the transmitting node may reset the transmission parameters (e.g., RV) according to the number of transmissions of the TB (S603), and transmit the TB to the receiving node based on the reset transmission parameters (S604).

On the other hand, when the number of transmissions of the TB within the aggregated transmission period is equal to the AF, the transmitting node may perform steps after the step S606-1. For example, when a HARQ feedback operation is disabled, the transmitting node may perform a transmission operation of a new TB (S609). On the other hand, when a HARQ feedback operation is enabled, the transmitting node may receive HARQ-ACK from the receiving node, and may operate based on the received HARQ-ACK.

Meanwhile, the receiving node may perform a reception operation of the TB based on the transmission parameters. For example, the receiving node may generate HARQ-ACK (e.g., ACK or NACK) based on a decoding result of the TB (S605). The step S605 may be performed on a TB basis. The receiving node may compare the number of receptions of the TB within the aggregated transmission period and the AF (S606-2). If the number of receptions of the TB within the aggregated transmission period is less than the AF, the receiving node may reset the transmission parameters (e.g., RV) according to the number of receptions of the TB (S603), and may perform a reception operation of the TB based on the reset transmission parameters. On the other hand, when the number of receptions of the TB within the aggregated transmission period is equal to the AF, the receiving node may transmit HARQ-ACK(s) for all the TBs received in the aggregated transmission period to the transmitting node (S607). The step S607 may be performed when a HARQ feedback operation is enabled. When a HARQ feedback operation is disabled, the receiving node may perform a reception operation of a new TB without performing the step S607.

The HARQ-ACK transmitted in the step S607 may include a decoding result for each of all TBs received in the aggregated transmission period. As another example, when decoding results for all TBs received in the aggregated transmission period are failures, the HARQ-ACK transmitted in the step S607 may be NACK. As yet another example, when a decoding result for at least one TB received in the aggregated transmission period is successful, the HARQ-ACK transmitted in the step S607 may be ACK.

The transmitting node may receive the HARQ-ACK from the receiving node, and may identify whether the HARQ-ACK is ACK or NACK (S608). When the HARQ-ACK is ACK, the transmitting node may determine that the TB transmitted in the step S604 has been successfully received by the receiving node, and may perform a transmission operation of a new TB in the next aggregated transmission period (S609). Alternatively, when a new TB does not exist in the transmitting node, the transmission operation of the TB may be terminated.

On the other hand, when the HARQ-ACK is NACK, the transmitting node may reset the transmission parameters by performing the step S601 again, and may perform a retransmission operation of the TB based on the reset transmission parameters. That is, the transmitting node may perform a rate control operation on the retransmission TB based on the HARQ-ACK (e.g., NACK). The transmission parameters for the retransmission TB may be set differently from the transmission parameters for the initial transmission of the TB. The retransmission operation of the TB may be performed in a new aggregated transmission period.

Meanwhile, each of PDSCH and PUSCH may be transmitted in various types according to a change in the transmission parameters. An AF, which is a transmission parameter, may be set by RRC signaling. For PDSCH transmission, the AF may be set to a unique value, and for PUSCH transmission, the AF may be set to a unique value. A transmission type may be defined according to the transmission parameters.

Performance (e.g., throughput, error rate, etc.) may vary depending on the transmission type at a specific S(I)NR. When the AF, which is a transmission parameter, is fixed to a specific value, it may be difficult to optimize the transmission type. That is, when the AF is fixed to a specific value, performance may decrease in a transmission type other than a specific transmission type corresponding to the specific AF. A transmission type to achieve a target performance may be limited. A phenomenon in which the transmission type is limited (e.g., phenomenon in which available transmission types are reduced) may become more severe as the target performance is set to be high.

The target performance may be set differently according to a usage purpose (e.g., transmission purpose) of a physical channel. The transmission purpose may be distinguished by a radio network temporary identifier (RNTI), a search space type, and/or the like. In addition, the target performance may vary according to whether HARQ feedback is enabled or disabled. The HARQ feedback may be enabled or disabled for each terminal, HARQ process, or logical channel identifier (LCD). In order to identify whether the HARQ feedback is enabled or disabled, a HARQ process number and the like may be further considered.

Among the transmission parameters, an MCS (e.g., MCS index) may be dynamically indicated by DCI. Various transmission types may be supported by the dynamic MCS. A communication performance may vary depending on the MCS. In general, the communication performance may be improved as the S(I)NR increases. As the value of the MCS index increases, a block error rate (BLER) may deteriorate at a specific S(I)NR. The throughput may be defined as (maximum throughput)×(1−BLER). As the value of the MCS index increases, the maximum throughput may increase, and thus the communication performance may be improved. (1-BLER) may decrease as the value of the MCS index increases at a specific S(I)NR, and thus the communication performance may be degraded. In conclusion, as the value of the MCS index increases, the maximum achievable throughput may increase, but the S(I)NR required to achieve the maximum throughput may increase.

Assuming that an S(I)NR and an AF of a channel are determined to be specific values, since the AF has a unique value, optimal communication performance may be exhibited only when a specific MCS index is used. The transmission type of PDSCH or PUSCH may be changed by using various MCS indices. However, since the AF has a unique value, the MCS range available for optimal communication performance may be reduced. That is, all MCS indices may not be used. When a specific MCS index corresponding to a specific AF is used, the optimal communication performance may be exhibited. When an MCS index other than the specific MCS index is used, the throughput may decrease and the error rate may increase. That is, if the AF is fixed to a unique value, the MCS range available for the optimal communication performance may be limited. In addition, when the target performance is set to be high, the available MCS range may be further limited. The use of MCS as well as other transmission parameters may be restricted due to the AF set to a unique value.

The use of the slot aggregation scheme may provide a tradeoff point between throughput and reliability similar to the HARQ operation, and thus an optimal point adaptation method may be used. If the transmission parameters are specified as unique values, provision of various trade-off points may be restricted. Due to this, the performance according to the optimal point adaptation method may be degraded.

In particular, a path loss in the NTN may be greater than a path loss in the NR communication system. Therefore, in the NTN, the S(I)NR may be low on average, and the probability that the distribution of formable S(I)NR will be concentrated in a relatively narrow section may be large. In this case, selection of transmission parameters may be further restricted. In order to prevent a decrease in the communication performance (e.g., throughput, BLER, etc.), only certain transmission parameters may be used. In this case, adaptation performance may be reduced, and scheduling flexibility may also be reduced.

In order to achieve the target performance without degradation of the communication performance, the AF may be independently set for each transmission type. In the NR communication system, transmission parameters such as the MCS may be quickly changed through DCI, but since the AF is set by RRC signaling for each of PDSCH and PUSCH, whenever the transmission parameters are changed to achieve the target performance, the AF may be configured by RRC signaling. In terms of a data payload, the data throughput may be reduced by the size of the RRC message transmitted for the AF change. Since a latency occurs for application of the RRC message, it may not be possible to use other transmission parameters due to the latency.

In order to solve the above problem, it may be necessary to dynamically change the AF according to the communication environment. For example, the AF may be provided for each transmission parameter. In this case, the transmission parameters related to the effective code rate and/or target performance may be considered. The effective code rate related parameters may include one or more transmission parameters defined in Table 4 below, and the target performance related parameters may include one or more transmission parameters defined in Table 5 below.

TABLE 4

Effective code rate related parameters

| | | |
|---|---|---|
| Aggregation factor | | |
| Number of transmissions | | |
| Number of layers | | |
| TB size | | |
| Resource mapping information (e.g., number of REs) | Number of RBs (e.g., number of subcarriers) | Mapping type Bitmap bandwidth part (BWP) start, BWP size resource indication value (RIV) |
| | Number of symbols (e.g., start and length indicator value (SLIV)) | |

TABLE 4-continued

Effective code rate related parameters

| | |
|---|---|
| MCS index | Target code rate |
| | Modulation order |
| | Spectral efficiency |
| Number of overheads | |

TABLE 5

Target performance related parameters

| | | |
|---|---|---|
| Transmission purpose related parameters | RNTI | Temporary cell (TC)-RNTI, Cell (C)-RNTI, MCS-C-RNTI, Configured scheduling (CS)-RNTI Random access (RA)-RNTI, Paging (P)-RNTI, System information (SI)-RNTI, MSGB-RNTI |
| | Search space related parameters | Type0 common search space (CSS), Type0A CSS, Type1 CSS, Type2 CSS, Type3 CSS UE-specific search space (USS) |
| NTN related parameters | HARQ feedback configuration | |
| HARQ related parameters | HARQ process number RV NDI CBG transmission information (CBGTI) CBG flushing out information (CBGFI) | |

Methods for Setting an AF for Each MCS Index

The MCS table may be configured as shown in Tables 6 and 7 below.

TABLE 6

| MCS index ($I_{MCS}$) | Modulation order ($Q_m$) | Target code rate (R × [1024]) | Spectral efficiency |
|---|---|---|---|
| 0 | 2 | 120 | 0.2344 |
| 1 | 2 | 157 | 0.3066 |
| 2 | 2 | 193 | 0.377 |
| 3 | 2 | 251 | 0.4902 |
| 4 | 2 | 308 | 0.6016 |
| 5 | 2 | 379 | 0.7402 |
| 6 | 2 | 449 | 0.877 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |

TABLE 7

| MCS index ($I_{MCS}$) | Modulation order ($Q_m$) | Target code rate (R × [1024]) | Spectral efficiency |
|---|---|---|---|
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |

TABLE 7-continued

| MCS index ($I_{MCS}$) | Modulation order ($Q_m$) | Target code rate (R × [1024]) | Spectral efficiency |
|---|---|---|---|
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.332 |
| 28 | 6 | 948 | 5.5547 |
| 29 | 2 | | reserved |
| 30 | 4 | | reserved |
| 31 | 6 | | reserved |

At a specific S(I)NR, the optimal AF may be different for each value of the transmission parameter (e.g., MCS index). In order to define a separate AF for each transmission parameter value, an $AF_{param}$ (e.g., $AF_{MCS}$) corresponding to each transmission parameter value may be defined, and a final AF may be determined based on $AF_{param}$. The MCS table reflecting the $AF_{MCS}$ (hereinafter, referred to as 'AF MCS table' or 'MCS-AF mapping table') may be configured as shown in Tables 8 and 9 below. The AF MCS table may be configured by system information, an RRC message, a MAC message, and/or a PHY message. Alternatively, the AF MCS table may be defined in a technical specification. The use of the AF MCS table may be enabled or disabled by system information, an RRC message, a MAC message, and/or a PHY message.

TABLE 8

| MCS index ($I_{MCS}$) | Modulation order ($Q_m$) | Target code rate (R × [1024]) | Spectral efficiency | $AF_{MCS}$ |
|---|---|---|---|---|
| 0 | 2 | 120 | 0.2344 | $AF_{MCS0}$ |
| 1 | 2 | 157 | 0.3066 | $AF_{MCS1}$ |
| 2 | 2 | 193 | 0.377 | $AF_{MCS2}$ |
| 3 | 2 | 251 | 0.4902 | $AF_{MCS3}$ |
| 4 | 2 | 308 | 0.6016 | $AF_{MCS4}$ |
| 5 | 2 | 379 | 0.7402 | $AF_{MCS5}$ |
| 6 | 2 | 449 | 0.877 | $AF_{MCS6}$ |
| 7 | 2 | 526 | 1.0273 | $AF_{MCS7}$ |
| 8 | 2 | 602 | 1.1758 | $AF_{MCS8}$ |
| 9 | 2 | 679 | 1.3262 | $AF_{MCS9}$ |
| 10 | 4 | 340 | 1.3281 | $AF_{MCS10}$ |
| 11 | 4 | 378 | 1.4766 | $AF_{MCS11}$ |
| 12 | 4 | 434 | 1.6953 | $AF_{MCS12}$ |
| 13 | 4 | 490 | 1.9141 | $AF_{MCS13}$ |
| 14 | 4 | 553 | 2.1602 | $AF_{MCS14}$ |
| 15 | 4 | 616 | 2.4063 | $AF_{MCS15}$ |

TABLE 9

| MCS index ($I_{MCS}$) | Modulation order ($Q_m$) | Target code rate (R × [1024]) | Spectral efficiency | $AF_{MCS}$ |
|---|---|---|---|---|
| 16 | 4 | 658 | 2.5703 | $AF_{MCS16}$ |
| 17 | 6 | 438 | 2.5664 | $AF_{MCS17}$ |
| 18 | 6 | 466 | 2.7305 | $AF_{MCS18}$ |
| 19 | 6 | 517 | 3.0293 | $AF_{MCS19}$ |
| 20 | 6 | 567 | 3.3223 | $AF_{MCS20}$ |
| 21 | 6 | 616 | 3.6094 | $AF_{MCS21}$ |
| 22 | 6 | 666 | 3.9023 | $AF_{MCS22}$ |
| 23 | 6 | 719 | 4.2129 | $AF_{MCS23}$ |
| 24 | 6 | 772 | 4.5234 | $AF_{MCS24}$ |
| 25 | 6 | 822 | 4.8164 | $AF_{MCS25}$ |
| 26 | 6 | 873 | 5.1152 | $AF_{MCS26}$ |
| 27 | 6 | 910 | 5.332 | $AF_{MCS27}$ |
| 28 | 6 | 948 | 5.5547 | $AF_{MCS28}$ |
| 29 | 2 | | reserved | $AF_{MCS29}$ |
| 30 | 4 | | reserved | $AF_{MCS30}$ |
| 31 | 6 | | reserved | $AF_{MCS31}$ |

$AF_{MCS}$ may be a natural number. The final AF may be $AF_{MCS}$. Alternatively, the final AF may be determined by applying $AF_{MCS}$ to a function. For example, 'Final AF=f($AF_{MCS}$)' may be defined. In this case, the existing AF may be additionally applied to the function. For example, 'Final AF=f(existing AF, $AF_{MCS}$)' may be defined. Here, f(existing AF, $AF_{MCS}$) may refer to (existing AF+$AF_{MCS}$). The function may be shared by the transmitting node and the receiving node. The final AF may be determined by one or a combination of two or more of the above-described methods. When $AF_{MCS}$ is set for each MCS index, a signaling procedure informing of the changed AF before the change of the MCS index may not be required.

$AF_{MCS}$ may be set for each MCS group. An MCS group may include one or more MCS indices. $AF_{MCS}$ may be set for each MCS group having the same modulation order. In this case, the AF may be expressed as $AF_{M\_CS}^{QPSK}$, $AF_{M\_CS}^{16\_QAM}$, $AF_{M\_CS}^{64\_QAM}$, or the like. The AF may be set for each target code rate. Alternatively, the AF may be set for each spectral efficiency.

$AF_{MCS}$ may be defined as a function using the MCS index. For example, '$AF_{MCS}$=g(MCS index)' may be defined. Here, the final AF may be replaced by a function of the MCS index. For example, 'Final AF=h(param)=h(MCS index)' or 'Final AF=h(existing AF, param)=h(existing AF, MCS index)' may be defined. The function may be shared by the transmitting node and the receiving node. Since the MCS index is indicated by DCI, if the function is shared by the transmitting node and the receiving node, the AF suitable for the communication environment may be indicated using DCI.

As the value of the MCS index increases at a specific S(I)NR, the BLER may deteriorate. Therefore, in order to satisfy a specific target BLER, $AF_{MCS}$ may be defined in a form monotonically increasing according to an increase in the value of the MCS index. When the function for $AF_{MCS}$ is shared by the transmitting node and the receiving node, only the MCS index in which $AF_{MCS}$ is changed may be transmitted by using the above-described property.

The AF may be defined as 1, 2, 4, or 8, up to 4 MCS indices may be shared, and the AF suitable for the communication environment may be indicated through the shared MCS indices. Each of the four MCS indices may be mapped to each of four different AFs. If other AF (e.g., 16) which is not one of the values (e.g., 1, 2, 4, or 8) is defined, an additional MCS index which corresponds to the other AF may be shared in order to indicate the suitable AF for the communication environment. 'AF=1' may indicate that slots are not aggregated. If the communication performance is not improved at a specific S(I)NR, a specific MCS index may not be used. In this case, the monotonic increase of $AF_{MCS}$ may not be established, and four or more MCS indices may be required. 'MCS index={29,30,31}' may be used for retransmission for the corresponding modulation order, and in this case, the monotonic increase of $AF_{MCS}$ may not be established. Considering that the retransmission operation is performed, the AF for the retransmission operation may be set differently from the AF for the initial transmission operation. In order to distinguish the initial transmission operation from the retransmission operation, the NDI may be used instead of the MCS index. In order to support this operation, $AF_{NDI}$ may be defined instead of $AF_{MCS}$. In addition to the NDI and MCS, a transmission counter (e.g., n-th transmission) used for slot aggregation may be used.

A combination of the above-described methods may be used, and the discrimination method may not be limited to a specific method. $AF_{MCS}$ for retransmission operation may be interpreted as the final AF. The final AF may be determined based on a function reflecting $AF_{MCS}$. Here, the existing AF may be additionally applied to the function. In addition, the $AF_{MCS}$ or final AF used in the existing transmission may be additionally applied to the function. The above-described exemplary embodiments may not mean that the monotonous increase of the AF as the value of the MCS index increases should be established. The above-described exemplary embodiments may mean that the function may be simply defined using the monotonically increasing characteristic. The form of the function may be 'monotonically increasing form', 'monotonically decreasing form', 'combination form of monotonically increasing and monotonic decreasing', or 'arbitrary form' in a specific section.

Although it is assumed in the above-described exemplary embodiments that the target performance is fixed for a specific S(I)NR, this may not be necessary. Since the AF is set for each value of the transmission parameter, it may be interpreted that the target performance may be individually set for each value of the transmission parameter for a specific S(I)NR. This may mean that the same target performance may be set for different S(I)NRs.

Since the value of optimal AF is related to the effective code rate, the effective code rate may be adjusted to obtain the value of optimal AF. Based on the MCS table described above, the code rate may depend on the MCS index. Therefore, when the AF is set for each value of the transmission parameter, the MCS index may be included in the range of the transmission parameter. In this case, the effective code rate suitable for the channel situation may accurately correspond to the MCS index, and accordingly, the most accurate optimal AF value may be set.

In order to determine the final AF, a method of sharing the function for $AF_{MCS}$ for each MCS index may not be limited. Considering the above-described exemplary embodiments, the function and/or the MCS table (e.g., MCS index) may be shared between the transmitting node and the receiving node. The function and/or MCS index may be configured to the communication node (e.g., transmitting node and/or receiving node) through at least one of an RRC message, MAC-CE, and PHY message (e.g., DCI, UCI, physical random access channel (PRACH), synchronization signal/physical broadcast channel (SS/PBCH) block, reference signal (RS), or the like). When the function and/or MCS index is signaled by DCI, a field for controlling the AF in the DCI may be newly defined. Alternatively, the function and/or MCS index may be indicated by reinterpreting the existing field(s) included in the DCI.

The value of the field(s) included in the DCI may be determined as the final AF. The final AF may be determined by reflecting the value of the field(s) included in the DCI to the function. Here, the existing AF may be additionally applied to the function. The function may be shared between the transmitting node and the receiving node. Alternatively, the function may be defined in a technical specification. The above-described exemplary embodiments may not be limited to one transmission parameter. For example, the above-described exemplary embodiments may be applied in combination with a plurality of transmission parameters.

The above-described exemplary embodiments (e.g., methods for indicating the AF) may be applied to other effective code rate-related parameter(s) without restriction. Also, the above-described exemplary embodiments (e.g., methods for indicating the AF) may be applied to the target performance-related parameter(s).

Methods for Setting an AF for Each RNTI

Types of the RNTI in a communication system may be defined as shown in Table 10 below.

TABLE 10

| Value (hexadecimal) | RNTI |
|---|---|
| 0000 | N/A |
| 0001-FFF2 | RA-RNTI, MSGB-RNTI, Temporary C-RNTI, C-RNTI, CI-RNTI, MCS-C-RNTI, CS-RNTI, TPC-PUCCH-RNTI, TPC-PUSCH-RNTI, TPC-SRS-RNTI, INT-RNTI, SFI-RNTI, SP-CSI-RNTI, PS-RNTI, SL-RNTI, SLCS-RNTI and SL Semi-Persistent Scheduling V-RNTI |
| FFF3-FFFD | Reserved |
| FFFE | P-RNTI |
| FFFF | SI-RNTI |

The purposes of using the RNTIs in the communication system may be defined as shown in Tables 11 to 13 below.

TABLE 11

| RNTI | use | Transport channel | Logical channel |
|---|---|---|---|
| P-RNTI | Paging and System Information change notification | PCH | PCCH |
| SI-RNTI | Broadcast of System Information | DL-SCH | BCCH |
| RA-RNTI | Random Access Response | DL-SCH | N/A |
| MSGB-RNTI | Random Access Response for 2-step RA type | DL-SCH | CCCH, DCCH |
| Temporary C-RNTI | Contention Resolution (when no valid C-RNTI is available) | DL-SCH | CCCH, DCCH |
| Temporary C-RNTI | Msg3 transmission | UL-SCH | CCCH, DCCH, DTCH |
| C-RNTI, MCS-C-RNTI | Dynamically scheduled unicast transmission | UL-SCH | DCCH, DTCH |
| C-RNTI | Dynamically scheduled unicast transmission | DL-SCH | CCCH, DCCH, DTCH |
| MCS-C-RNTI | Dynamically scheduled unicast transmission | DL-SCH | DCCH, DTCH |
| C-RNTI | Triggering of PDCCH ordered random access | N/A | N/A |
| CS-RNTI | Configured scheduled unicast transmission (activation, reactivation and retransmission) | DL-SCH, UL-SCH | DCCH, DTCH |

TABLE 12

| RNTI | use | Transport channel | Logical channel |
|---|---|---|---|
| CS-RNTI | Configured scheduled unicast transmission (deactivation) | N/A | N/A |
| TPC-PUCCH-RNTI | PUCCH power control | N/A | N/A |
| TPC-PUSCH-RNTI | PUSCH power control | N/A | N/A |

TABLE 12-continued

| RNTI | use | Transport channel | Logical channel |
|---|---|---|---|
| TPC-SRS-RNTI | SRS trigger and power control | N/A | N/A |
| INT-RNTI | Indication pre-emption in DL | N/A | N/A |
| SFI-RNTI | Slot Format Indication on the given cell | N/A | N/A |
| SP-CSI-RNTI | Activation of Semi-persistent CSI reporting on PUSCH | N/A | N/A |
| CI-RNTI | Cancellation indication in UL | N/A | N/A |
| PS-RNTI | DCP to indicate whether to start drx-onDurationTimer for associated DRX cycle | N/A | N/A |

TABLE 13

| RNTI | use | Transport channel | Logical channel |
|---|---|---|---|
| SL-RNTI | Dynamically scheduled sidelink transmission | SL-SCH | SCCH, STCH |
| SLCS-RNTI | Configured scheduled sidelink transmission (activation, reactivation and retransmission) | SL-SCH | SCCH, STCH |
| SLCS-RNTI | Configured scheduled sidelink transmission (deactivation) | N/A | N/A |
| SL Semi-Persistent Scheduling V-RNTI (NOTE 2) | Semi-Persistently scheduled sidelink transmission for V2X sidelink communication (activation, reactivation and retransmission) | SL-SCH | STCH |
| SL Semi-Persistent Scheduling V-RNTI (NOTE 2) | Semi-Persistently scheduled sidelink transmission for V2X sidelink communication (deactivation) | N/A | N/A |

NOTE 1:
The usage of MCS-C-RNTI is equivalent to that of C-RNTI in MAC procedures (except for the C-RNTI MAC CE).
NOTE 2:
The MAC entity uses SL Semi-Persistent Scheduling V-RNTI to control semi-persistently scheduled sidelink transmission on SL-SCH for V2X sidelink communication as specified in clause 5.14.1.1 of TS 36.321 [22].

The RNTI used for PDSCH transmission may be {P-RNTI, SI-RNTI, RA-RNTI, MSGB-RNTI, TC-RNTI, C-RNTI, MCS-C-RNTI, CS-RNTI}. The AF may be set for each RNTI. The AF set for each RNTI may be referred to as $AF_{RNTI}$. $AF_{RNTI}$ (e.g., $AF_{RNTI}$ for PDSCH transmission) may be set as shown in Table 14 (e.g., RNTI-AF mapping table) below. The final AF may be determined based on $AF_{RNTI}$. The method of determining the final AF based on $AF_{RNTI}$ may be the same as or similar to the method of determining the final AF based on $AF_{MCS}$ described above.

TABLE 14

| RNTI | $AF_{RNTI}$ (PDSCH) |
|---|---|
| P-RNTI | $AF_{RNTI-P}$ |
| SI-RNTI | $AF_{RNTI-SI}$ |
| RA-RNTI | $AF_{RNTI-RA}$ |
| MSGB-RNTI | $AF_{RNTI-MSGB}$ |
| Temporary C-RNTI | $AF_{RNTI-TC}$ |
| C-RNTI | $AF_{RNTI-C}$ |
| MCS-C-RNTI | $AF_{RNTI-MCS-C}$ |
| CS-RNTI | $AF_{RNTI-CS}$ |

The RNTIs may be grouped for each transmission purpose, and $AF_{RNTI}$ for each RNTI group may be set. For example, since {P-RNTI, SI-RNTI} may be used for transmission of system information, they may be grouped into one RNTI group. Since {RA-RNTI, MSGB-RNTI} may be used for a random access (RA) procedure, they may be grouped into one RNTI group. Since {C-RNTI, MCS-C-RNTI, CS-RNTI} may be used for unicast transmission, they may be grouped into one RNTI group. $AF_{RNTI}$ of CS-RNTI may be set independently of $AF_{RNTI}$ of RNTI for dynamic scheduling. Since TC-RNTI is used for contention resolution, it may be configured as a separate RNTI group. Alternatively, since the contention resolution procedure may be viewed as a part of the RA procedure, {RA-RNTI, MSGB-RNTI, TC-RNTI} may be grouped into the same RNTI group. Alternatively, since TC-RNTI is used for unicast transmission, {C-RNTI, MCS-C-RNTI, CS-RNTI, TC-RNTI} may be grouped into the same RNTI group. Since the MCS table for transmission associated with MCS-C-RNTI (e.g., low spectral efficiency MCS table) is different from the MCS table for transmission associated with C-RNTI, $AF_{RNTI}$ of MCS-C-RNTI may be set independently from $AF_{RNTI}$ of C-RNTI. The aforementioned $AF_{RNTI}$ may be set for each RNTI group, and the blind retransmission method may be performed based on $AF_{RNTI}$ configured for each RNTI group.

$AF_{RNTI}$ for PUSCH transmission may be set as shown in Table 15 below (e.g., RNTI-AF mapping table).

TABLE 15

| RNTI | $AF_{RNTI}$ (PUSCH) |
|---|---|
| Temporary C-RNTI | $AF_{RNTI-TC}$ |
| C-RNTI | $AF_{RNTI-C}$ |
| MCS-C-RNTI | $AF_{RNTI-MCS-C}$ |
| CS-RNTI | $AF_{RNTI-CS}$ |

In a PUSCH transmission procedure, RNTIs may be grouped for each transmission purpose, and $AF_{RNTI}$ for each RNTI group may be set. Since {C-RNTI, MCS-C-RNTI, CS-RNTI} may be used for unicast transmission, they may be grouped into one RNTI group. $AF_{RNTI}$ of CS-RNTI may be set independently of $AF_{RNTI}$ of RNTI for dynamic scheduling. Since TC-RNTI is used for Msg3 transmission, it may be configured as a separate RNTI group. Alternatively, since the Msg3 transmission procedure may be viewed as a part of the RA procedure, {RA-RNTI, MSGB-RNTI, TC-RNTI} may be grouped into the same RNTI group. Alternatively, since TC-RNTI is used for unicast transmission, {C-RNTI, MCS-C-RNTI, CS-RNTI, TC-RNTI} may be grouped into the same RNTI group. Since the MCS table for transmission associated with MCS-C-RNTI (e.g., low spectral efficiency MCS table) is different from the MCS table for transmission associated with C-RNTI, $AF_{RNTI}$ of MCS-C-RNTI may be set independently of $AF_{RNTI}$ of C-RNTI. The aforementioned $AF_{RNTI}$ may be set for each RNTI group, and the blind retransmission method may be performed based on $AF_{RNTI}$ set for each RNTI group.

Methods for Setting an AF for Each Search Space (or Search Space Set)

The AF may be set for each search space (or search space set). The AF for each search space may be referred to as $AF_{SS}$. $AF_{SS}$ for CSS may be referred to as $AF_{CSS}$, and $AF_{SS}$ for USS may be referred to as $AF_{USS}$. $AF_{SS}$ may be set as shown in Table 16 (e.g., SS-AF mapping table) below.

TABLE 16

| Search space (or, search space set) | Configured by | $AF_{SS}$ |
|---|---|---|
| Type0 CSS | pdcch-ConfigSIB1 in MIB or searchSpaceSIB1 in PDCCH-ConfigCommon or searchSpaceZero in PDCCH-ConfigCommon | $AF_{CSS0}$ |
| Type0A CSS | searchSpaceOtherSystemInformation in PDCCH-ConfigCommon | $AF_{CSS0A}$ |
| Type1 CSS | ra-SearchSpace in PDCCH-ConfigCommon | $AF_{CSS1}$ |
| Type2 CSS | pagingSearchSpace in PDCCH-ConfigCommon | $AF_{CSS2}$ |
| Type3 CSS | SearchSpace in PDCCH-Config with searchSpaceType = common | $AF_{CSS3}$ |
| USS | SearchSpace in PDCCH-Config with psearchSaceType = ue-Specific | $AF_{USS}$ |

The search spaces may be grouped for each transmission purpose, and $AF_{SS}$ for each search space group may be set. Since {Type0 CSS, Type0A CSS, Type1 CSS, Type2 CSS, Type3 CSS} is CSS, they may be grouped into one search space group. The USS may be configured as one search space group independent of the CSS. Alternatively, since {Type0 CSS, Type0A CSS} is used for transmission of system information (e.g., SIB1 and/or other system information (OSI)), they may be grouped into one search space group. The Type2 CSS may be configured as an independent search space group. Since the Type2 CSS is used to notify a change of system information through paging, {Type0 CSS, Type0A CSS, Type2 CSS} related to system information may be grouped into one search space group. The Type3 CSS may be configured as an independent search space group. Alternatively, {Type3 CSS, USS} may be configured as one search space group.

Methods for Setting an AF for Each RNTI Associated with a Search Space

The AF may be set for each RNTI associated with a search space (or a search space set). The AF set for each RNTI associated with a search space may be referred to as $AF_{SS\text{-}RNTI}$. $AF_{SS\text{-}RNTI}$ may be set as shown in Tables 17 to 19 below (e.g., SS-RNTI pair-AF mapping table).

TABLE 17

| Search space (or, search space set) | DCI format's CRC scrambled by | $AF_{SS\text{-}RNTI}$ |
|---|---|---|
| Type0 CSS | SI-RNTI | $AF_{CSS0,SI}$ |
| Type0A CSS | SI-RNTI | $AF_{CSS0A,SI}$ |
| Type1 CSS | RA-RNTI, | $AF_{CSS1,RA}$ |
|  | MsgB-RNTI | $AF_{CSS1,MSGB}$ |
|  | TC-RNTI | $AF_{CSS1,TC}$ |
| Type2 CSS | P-RNTI | $AF_{CSS2,P}$ |

TABLE 18

| Search space (or, search space set) | DCI format's CRC scrambled by | $AF_{SS\text{-}RNTI}$ |
|---|---|---|
| Type3 CSS | INT-RNTI, | $AF_{CSS3,INT}$ |
|  | SFI-RNTI, | $AF_{CSS3,SFI}$ |
|  | TPC-PUSCH-RNTI, | $AF_{CSS3,TPC\text{-}PUSCH}$ |
|  | TPC-PUCCH-RNTI, | $AF_{CSS3,TPC\text{-}PUCCH}$ |
|  | TPC-SRS-RNTI, | $AF_{CSS3,TPC\text{-}SRS}$ |
|  | CI-RNTI, | $AF_{CSS3,CI}$ |
|  | PS-RNTI | $AF_{CSS3,PS}$ |
|  | C-RNTI, | $AF_{CSS3,C}$ |
|  | MCS-C-RNTI, | $AF_{CSS3,MCS\text{-}C}$ |
|  | CS-RNTI(s) | $AF_{CSS3,CS}$ |

TABLE 19

| Search space (or, search space set) | DCI format's CRC scrambled by | $AF_{SS\text{-}RNTI}$ |
|---|---|---|
| USS | C-RNTI | $AF_{USS,C}$ |
|  | MCS-C-RNTI | $AF_{USS,MCS\text{-}C}$ |
|  | SP-CSI-RNTI | $AF_{USS,SP\text{-}CSI}$ |
|  | CS-RNTI(s) | $AF_{USS,CS}$ |
|  | SL-RNTI | $AF_{USS,SL}$ |
|  | SL-CS-RNTI | $AF_{USS,SL,CS}$ |
|  | SL-L-CS-RNTI | $AF_{USS,SL\text{-}L\text{-}CS}$ |

$AF_{SS\text{-}RNTI}$ may be set for each SS-RNTI group. The SS-RNTI group may include SS-RNTI pair(s) of the same type and/or SS-RNTI pair(s) of a similar type. The SS-RNTI group may be configured based on the method(s) described above. When SS-RNTI pairs to be applied to exemplary embodiments are not defined in Tables 17 to 19, $AF_{SS\text{-}RNTI}$ may be defined in consideration of some SS-RNTI pairs instead of all SS-RNTI pairs.

In order to support PDSCH transmission, $AF_{SS\text{-}RNTI}$ for a search space associated with the RNTI for PDSCH transmission may be defined. In order to support PUSCH transmission, $AF_{SS\text{-}RNTI}$ for a search space associated with the RNTI for PUSCH transmission may be defined.

Meanwhile, in the communication system (e.g., NR communication system, NTN), a HARQ feedback enabled mode and/or a HARQ feedback disabled mode may be used. The target performance may vary depending on enabling or disabling a HARQ feedback.

The effect of the HARQ retransmission operation may be achieved by improving a BLER of initial transmission through HARQ retransmission. In the HARQ feedback enabled mode, a target BLER may generally refer to the BLER of the initial transmission. In order to maintain a reliability according to the HARQ feedback disabled mode in the NTN similar to a reliability according to the HARQ feedback enabled mode, methods to replace the effect of the HARQ retransmission operation may be needed. As one of the above-described methods, transmission based on slot aggregation (hereinafter, referred to as 'slot aggregation transmission') may be considered. The slot aggregation transmission may refer to the above-described blind retransmission. The performing of the slot aggregation transmission may mean performing HARQ retransmission operation as many times as a preset AF. A target BLER of slot aggregation transmission may be set to be the same as or similar to a target BLER of HARQ retransmission. In this case, the reliability of the slot aggregation transmission may be maintained similar to the reliability of the HARQ retransmission. Accordingly, the target BLER of the HARQ feedback enabled mode may be different from the target BLER of the HARQ feedback disabled mode. In this case, an AF for the HARQ feedback enabled mode may be set independently of the AF for the HARQ feedback disabled mode.

The AF (e.g., $AF_{HFC}$) for each HARQ feedback configuration may be set as shown in Table 20 (e.g., HARQ-AF mapping table) below. The method of determining a final AF based on $AF_{HFC}$ may be the same as or similar to the above-described method of determining a final AF based on $AF_{MCS}$.

TABLE 20

| HARQ feedback configuration | $AF_{HFC}$ |
|---|---|
| Enabled | $AF_{HFC,E}$ |
| Disabled | $AF_{HFC,D}$ |

The HARQ feedback configuration (e.g., enabled or disabled) may be configured for each terminal, HARQ process, or LCD. The HARQ feedback configuration shown in Table 20 may be configured for each terminal. When 16 HARQ processes are supported in the communication system, AF (e.g., $AF_{HARQ}$) for each HARQ process may be configured as shown in Table 21 (e.g., HPN-AF mapping table) below.

TABLE 21

| HARQ process number | $AF_{HARQ}$ |
|---|---|
| 0 | $AF_{HARQ0}$ |
| 1 | $AF_{HARQ1}$ |
| 2 | $AF_{HARQ2}$ |
| 3 | $AF_{HARQ3}$ |
| 4 | $AF_{HARQ4}$ |
| 5 | $AF_{HARQ5}$ |
| 6 | $AF_{HARQ6}$ |
| 7 | $AF_{HARQ7}$ |
| 8 | $AF_{HARQ8}$ |
| 9 | $AF_{HARQ9}$ |
| 10 | $AF_{HARQ10}$ |
| 11 | $AF_{HARQ11}$ |
| 12 | $AF_{HARQ12}$ |
| 13 | $AF_{HARQ13}$ |
| 14 | $AF_{HARQ14}$ |
| 15 | $AF_{HARQ15}$ |

An HARQ process group including one or more HARQ processes may be configured, and an AF may be configured for each HARQ process group. Alternatively, an AF may be configured for each parameter related to a control resource set (CORESET), bandwidth part (BWP), or DCI format.

Figure 7:
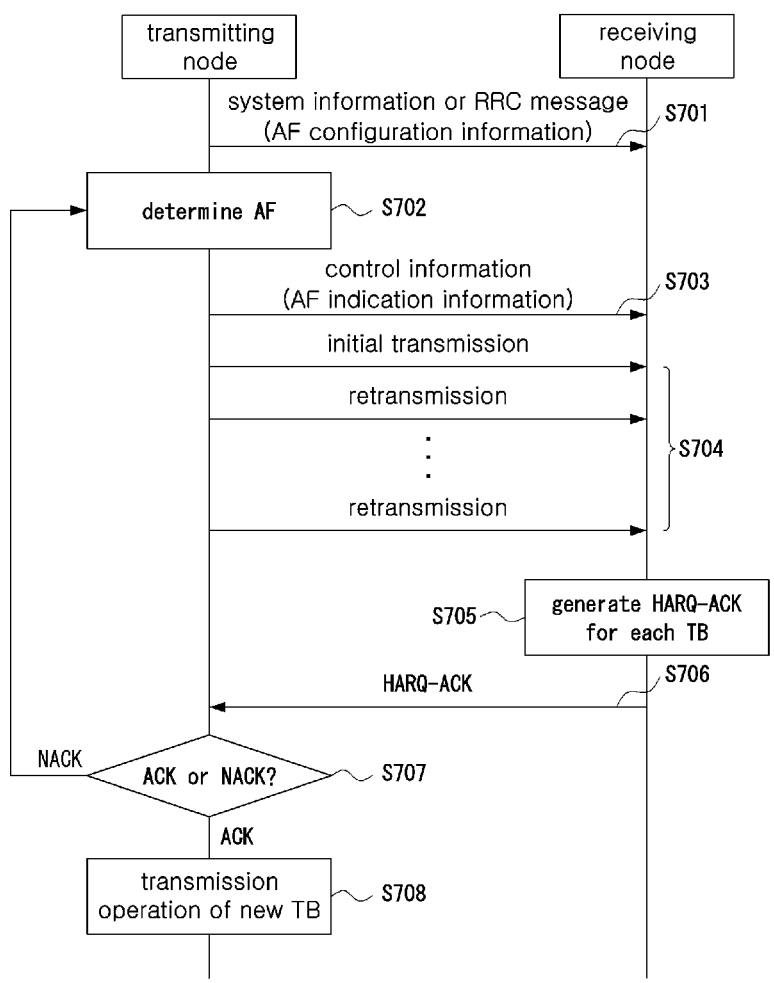
FIG. 7 is a sequence chart illustrating a third exemplary embodiment of a retransmission method in a communication system.

FIG. 7 is a sequence chart illustrating a third exemplary embodiment of a retransmission method in a communication system.

Referring to FIG. 7, the communication system (e.g., LTE communication system, NR communication system, or non-terrestrial network) may include a transmitting node and a receiving node. Each of the transmitting node and the receiving node may be configured identically or similarly to the communication node 300 shown in FIG. 3. The retransmission method shown in FIG. 7 may be performed based on the slot aggregation scheme. The retransmission method based on the slot aggregation scheme may be a blind retransmission method. For example, the same TB (e.g., TB configured with the same data unit) may be repeatedly transmitted in an aggregated transmission period (e.g., slots indicated by an AF). The TBs repeatedly transmitted in one aggregated transmission period may have different RVs.

In a step S701, the transmitting node may transmit system information (e.g., MIB and/or SIB) and may transmit an RRC message (e.g., RRC reconfiguration message). The system information and/or RRC message may include AF configuration information. When an AF is set for each MCS, the AF configuration information may include the AF MCS tables (e.g., MCS-AF mapping table) shown in Tables 8 and 9. Also, the AF configuration information may include information indicating whether to use the MCS-AF mapping table. For example, when the information indicates the use of the MCS-AF mapping table, parameter(s) mapped to a specific index in the MCS-AF mapping table may be used in a communication procedure between the transmitting node and the receiving node. On the other hand, when the information does not indicate the use of the MCS-AF mapping table, parameter(s) mapped to a specific index in the existing MCS table (e.g., MCS tables shown in Tables 6 and 7) may be used in the communication procedure between the transmitting node and the receiving node. The MCS-AF mapping table may not be included in the system information and/or the RRC message. That is, the MCS-AF mapping table may be defined in a technical specification. In this case, when the use of the MCS-AF mapping table is indicated, the communication procedure between the transmitting node and the receiving node may be performed using parameter(s) mapped to a specific index in the MCS-AF mapping table defined in the technical specification.

Alternatively, when an AF is set for each RNTI, the AF configuration information may include the RNTI-AF mapping tables shown in Tables 14 and 15. Also, the AF configuration information may include information indicating whether to use the RNTI-AF mapping table. For example, when the information indicates the use of the RNTI-AF mapping table, an AF mapped to an RNTI in the RNTI-AF mapping table may be used in a communication procedure between the transmitting node and the receiving node. The RNTI-AF mapping table may not be included in the system information and/or the RRC message. That is, the RNTI-AF mapping table may be defined in a technical specification. In this case, when the use of the RNTI-AF mapping table is indicated, the communication procedure between the transmitting node and the receiving node may be performed using an AF mapped to an RNTI in the RNTI-AF mapping table defined in the technical specification.

Alternatively, when an AF is set for each search space, the AF configuration information may include the search space (SS)-AF mapping table shown in Table 16. Also, the AF configuration information may include information indicating whether to use the SS-AF mapping table. For example, when the information indicates the use of the SS-AF mapping table, an AF mapped to a search space (or search space set) in the SS-AF mapping table may be used in the communication procedure between the transmitting node and the receiving node. The SS-AF mapping table may not be included in the system information and/or the RRC message. That is, the SS-AF mapping table may be defined in a technical specification. In this case, when the use of the SS-AF mapping table is indicated, the communication procedure between the transmitting node and the receiving node may be performed using an AF mapped to a search space in the SS-AF mapping table defined in the technical specification.

Alternatively, when an AF is set for each SS-RNTI pair, the AF configuration information may include the SS-RNTI pair-AF mapping tables shown in Tables 17 to 19. Also, the AF configuration information may include information indicating whether to use the SS-RNTI pair-AF mapping table. For example, when the information indicates the use of the SS-RNTI pair-AF mapping table, an AF mapped to an SS-RNTI pair in the SS-RNTI pair-AF mapping table may be used in the communication procedure between the transmitting node and the receiving node. The SS-RNTI pair-AF mapping table may not be included in the system information and/or the RRC message. That is, the SS-RNTI pair-AF mapping table may be defined in a technical specification. In this case, when the use of the SS-RNTI pair-AF mapping table is indicated, the communication procedure between the transmitting node and the receiving node may be performed using an AF mapped to an SS-RNTI pair within the SS-RNTI pair-AF mapping table defined in the technical specification.

Alternatively, when an AF is set for each HARQ feedback configuration (e.g., enabled or disabled), the AF configuration information may include the HARQ-AF mapping table described in Table 20. Also, the AF configuration information may include information indicating whether to use the HARQ-AF mapping table. For example, when the information indicates the use of the HARQ-AF mapping table, an AF mapped to the HARQ feedback configuration in the HARQ-AF mapping table may be used in the communication procedure between the transmitting node and the receiving node. The HARQ-AF mapping table may not be included in the system information and/or the RRC message. That is, the HARQ-AF mapping table may be defined in a technical specification. In this case, when the use of the HARQ-AF mapping table is indicated, the communication procedure between the transmitting node and the receiving node may be performed using the AF mapped to the HARQ feedback configuration within the HARQ-AF mapping table defined in the technical specification.

Alternatively, when an AF is set for each HARQ process number, the AF configuration information may include the HPN-AF mapping table shown in Table 21. Also, the AF configuration information may include information indicating whether to use the HPN-AF mapping table. For example, when the information indicates the use of the HPN-AF mapping table, an AF mapped to a HARQ process number within the HPN-AF mapping table may be used in the communication procedure between the transmitting node and the receiving node. The HPN-AF mapping table may not be included in the system information and/or the RRC message. That is, the HPN-AF mapping table may be defined in a technical specification. In this case, when the use of the HPN-AF mapping table is indicated, the communication procedure between the transmitting node and the receiving node may be performed using an AF mapped to a HARQ process number within the HPN-AF mapping table defined in the technical specification.

Meanwhile, the receiving node may receive the system information and/or the RRC message from the transmitting node, and may identify the AF configuration information included in the system information and/or the RRC message. When a data unit (e.g., TB and/or CBG) is transmitted based on the blind retransmission scheme, the transmitting node may determine an AF (e.g., final AF) (S702). The AF may refer to the number of (re)transmissions of the data unit. The transmitting node may determine the AF based on one mapping table among the mapping tables shown in Table 22 below.

TABLE 22

| Type of mapping table |
| --- |
| MCS-AF mapping table |
| RNTI-AF mapping table |
| SS-AF mapping table |
| SS-RNTI pair-AF mapping table |
| HARQ-AF mapping table |
| HPN-AF mapping table |

The transmitting node may generate control information (e.g., DCI) in consideration of the mapping table used in the step S702. For example, when the MCS-AF mapping table is used in the step S702, information on the MCS index mapped to the AF may be included in the control information. Alternatively, after the MCS index is determined first, the AF mapped to the corresponding MCS index may be determined. As another example, when the HARQ-AF mapping table is used in the step S702, the HARQ feedback configuration (e.g., enabled or disabled) mapped to the AF may be included in the control information. Alternatively, after the HARQ feedback configuration is determined first, the AF mapped to the corresponding HARQ feedback setting may be determined.

For another example, when the HPN-AF mapping table is used in the step S702, information on the HARQ process number mapped to the AF may be included in the control information. Alternatively, after the HARQ process number is determined first, the AF mapped to the corresponding HARQ process number may be determined. For another example, when the RNTI-AF mapping table or the SS-RNTI pair-AF mapping table is used in the step S702, the control information (e.g., cyclic redundancy check (CRC) of the control information) may be scrambled with the RNTI mapped to the AF. Alternatively, after the RNTI is determined first, the AF mapped to the RNTI or SS-RNTI pair may be determined.

In addition, the control information may include information indicating a mapping table used among the mapping tables shown in Table 22. The transmitting node may transmit information indicating whether to use the mapping table shown in Table 22 to the receiving node. The information indicating whether to use the mapping table may be transmitted through a MAC CE. Alternatively, the information indicating whether to use the mapping table may be transmitted in the steps S701 and/or S703.

The transmitting node may transmit the control information to the receiving node (S703). The control information may be transmitted on a PDCCH. When the SS-AF mapping table or the SS-RNTI pair-AF mapping table is used in the step S702, the control information may be transmitted in a search space (or search space set) mapped to the AF. Alternatively, the type of the search space (or search space set) may be determined first, and the AF mapped to the type of the search space (or search space set) may be determined. When the AF is configured for each CORESET, the control information may be transmitted through a CORESET mapped to the AF.

The receiving node may obtain the corresponding control information by performing a monitoring operation on the control information. The receiving node may identify the AF (e.g., final AF) based on the mapping table used for determining the AF (i.e., mapping table shown in Table 22) and [search space (or search space set, CORESET) in which the control information is detected, RNTI associated with the control information, MCS index indicated by the control information, HARQ feedback configuration indicated by the control information, or HARQ process number indicated by the control information]. Since the AF is indicated by the control information, the AF may be dynamically changed according to a communication environment (e.g., channel environment).

When the steps S701 to S703 or the steps S702 and S703 are performed, the same AF may be shared between the transmitting node and the receiving node. That is, the AF interpreted by the transmitting node may be the same as the AF interpreted by the receiving node. The transmitting node may perform a (re)transmission operation of the data unit (S704). In the step S704, the data unit may be transmitted according to the blind retransmission scheme. For example, when AF=4, the data unit may be repeatedly transmitted four times in the step S704. In the step S704, the receiving node may perform a reception operation of the data unit.

In the HARQ feedback disabled mode, the steps S705 and S706 may be omitted. In the HARQ feedback enabled mode, the steps S705 and S706 may be performed. In this case, the receiving node may generate one HARQ-ACK (e.g., ACK or NACK) for one or more data units received in the step S704 (S705). The receiving node may transmit the HARQ-ACK to the transmitting node (S706). The HARQ-ACK may be transmitted on a PUCCH or PUSCH. The transmitting node may receive the HARQ-ACK from the receiving node. When the HARQ-ACK is ACK and there is a new data unit (e.g., TB and/or CBG), the transmitting node may perform a transmission operation of new data (S708). When the new data is transmitted based on the blind retransmission scheme, the transmitting node may perform again from the step S702.

When the HARQ-ACK is NACK, the transmitting node may perform a retransmission operation of the data unit. The existing AF may be used in the retransmission procedure of the data unit. Alternatively, a new AF may be determined for retransmission of the data unit, and the retransmission procedure of the data unit may be performed based on the new AF.

Meanwhile, in exemplary embodiments, a plurality of AFs may be introduced to adaptively perform the slot aggregation transmission. The final AF may be selected or calculated based on transmission parameters for each transmission procedure. Since a different AF is used for each transmission type, the performance of the slot aggregation transmission may be maintained similar to the transmission performance according to the HARQ feedback. A plurality of AFs may be introduced in the communication system, the plurality of AFs may be shared between communication nodes in advance, and one AF among the plurality of AFs may be selected based on a transmission parameter(s). Therefore, the slot aggregation transmission (e.g., blind retransmission) may be adaptively performed.

An adaptation point may be increased by a plurality of AFs for transmission parameters, and a possibility of changing an AF after a plurality of AFs are shared may be relatively small. In order to change the AF, an operation of transmitting the changed AF, an operation of transmitting information for triggering the AF change and the changed AF, an operation of transmitting the changed AF and a reception response (e.g., ACK or NACK) to the changed AF, or an operation of transmitting information for triggering the AF change, the changed AF, and a reception response (e.g., ACK or NACK) to the changed AF may be required. The performing of these operations may be undesirable in the NTN with a large propagation delay.

However, the plurality of AFs may be shared in advance, and an appropriate adaptation point (e.g., final AF) among the shared plurality of AFs may be selected according to the transmission parameters. When the AF is previously shared, a separate operation may not be required to change the AF. Therefore, according to the exemplary embodiments, it is possible to respond faster than the existing transmission scheme.

The exemplary embodiments are not limited to one transmission parameter, but may be applied to two or more transmission parameters. The transmission parameter(s) to which exemplary embodiments are applied may not be limited to the effective code rate related parameter(s) and/or the target performance related parameter(s). The plurality of AFs may be applied to some transmission parameter(s) among the above-described transmission parameters. The AF for transmission parameter(s) to which the plurality of AFs are not applied may be used according to the existing method.

When a plurality of AFs are introduced, an appropriate AF may be derived through various methods. For example, when the HARQ feedback operation is used, the AF may be determined based on the number of ACKs and/or the number of NACKs. When the number of NACKs is relatively large (e.g., when it is determined that reliability is lowered), the value of AF may be increased. When it is determined that the throughput is low, the value of AF may be decreased. As another example, the value of the appropriate AF may be estimated based on channel state information (CSI) feedback information (e.g., S(I)NR). Alternatively, a feedback providing a guide for the value of AF may be introduced, and the value of the appropriate AF may be derived based on the feedback.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a receiving node in a communication system, the operation method comprising:
   receiving, from a transmitting node, mapping information between transmission parameters and aggregation factors (AFs);
   receiving a message including information indicating whether to use the mapping information from the transmitting node;
   receiving, from the transmitting node, control information including a first transmission parameter used for transmission of data among the transmission parameters;
   determining a first AF mapped to the first transmission parameter from among the AFs based on the mapping information when the message indicates use of the mapping information, or determining a first AF based on other information instead of the mapping information when the message does not indicate use of the mapping information;
   performing a first repetitive reception operation on the data transmitted from the transmitting node based on the first AF;

generating a reception response of the data when a number of receptions of the data is equal to the first AF;
informing the transmitting node of the reception response;
informing the transmitting node of information used for changing the first AF to a second AF; and
performing a second repetitive reception operation based on the second AF,
wherein the reception response means a reception failure when all results of all receptions of the data are failures, or the reception response means reception success when a result of at least one reception among all receptions of the data is successful, and
the second AF is determined by the transmitting node based on the information used for changing the first AF to the second AF.

2. The operation method according to claim 1, wherein the mapping information is a modulation and coding scheme (MCS)-AF mapping table, the first transmission parameter is one MCS index in the MCS-AF mapping table, and the first AF is mapped to the one MCS index.

3. The operation method according to claim 1, wherein the mapping information is a hybrid automatic repeat request (HARQ)-AF mapping table, the first transmission parameter is one HARQ feedback configuration in the HARQ-AF mapping table, the first AF is mapped to the one HARQ feedback configuration, and the one HARQ feedback configuration is a HARQ feedback enabled mode or a HARQ feedback disabled mode.

4. The operation method according to claim 1, wherein the mapping information is a HARQ process number (HPN)-AF mapping table, the first transmission parameter is one HPN in the HPN-AF mapping table, and the first AF is mapped to the one HPN.

5. The operation method according to claim 1, wherein the mapping information is received through at least one of a physical (PHY) message, a medium access control (MAC) message, and a radio resource control (RRC) message.

6. An operation method of a transmitting node in a communication system, the operation method comprising:
transmitting, to a receiving node, mapping information between transmission parameters and aggregation factors (AFs);
transmitting a message including information indicating whether to use the mapping information to the receiving node;
determining a first transmission parameter used for transmission of first data among the transmission parameters;
transmitting control information including the first transmission parameter to the receiving node;
repeatedly transmitting the first data to the receiving node, based on a first AF mapped to the first transmission parameter among the AFs when the message indicates use of the mapping information or based on a first AF determined based on other information instead of the mapping information when the message does not indicate use of the mapping information;
recognizing a reception response of the first data from the receiving node when a number of receptions of the first data is equal to the first AF in the receiving node;
changing the first AF to a second AF based on information used for changing the first AF to the second AF; and
repeatedly transmitting second data based on the second AF to the receiving node,
wherein the reception response means a reception failure when all results of all receptions of the first data are failures in the receiving node, or the reception response means reception success when a result of at least one reception among all receptions of the first data is successful in the receiving node.

7. The operation method according to claim 6, wherein the mapping information is a modulation and coding scheme (MCS)-AF mapping table, the first transmission parameter is one MCS index in the MCS-AF mapping table, and the first AF is mapped to the one MCS index.

8. The operation method according to claim 6, wherein the mapping information is a hybrid automatic repeat request (HARQ)-AF mapping table, the first transmission parameter is one HARQ feedback configuration in the HARQ-AF mapping table, the first AF is mapped to the one HARQ feedback configuration, and the one HARQ feedback configuration is a HARQ feedback enabled mode or a HARQ feedback disabled mode.

9. The operation method according to claim 6, wherein the mapping information is a HARQ process number (HPN)-AF mapping table, the first transmission parameter is one HPN in the HPN-AF mapping table, and the first AF is mapped to the one HPN.

10. The operation method according to claim 6, further comprising determining the first AF used for transmission of the first data,
wherein the first transmission parameter is a transmission parameter mapped to the first AF among the transmission parameters.

11. The operation method according to claim 6, wherein the mapping information is transmitted through at least one of a physical (PHY) message, a medium access control (MAC) message, and a radio resource control (RRC) message.

12. A receiving node, the receiving node comprising a processor, a memory electronically communicating with the processor, and instructions executable by the processor, wherein when executed by the processor, the instructions cause the receiving node to:
receive, from a transmitting node, mapping information between transmission parameters and aggregation factors (AFs);
receive a message including information indicating whether to use the mapping information from the transmitting node;
receive, from the transmitting node, control information including a first transmission parameter used for transmission of data among the transmission parameters;
determine a first AF mapped to the first transmission parameter from among the AFs based on the mapping information when the message indicates use of the mapping information, or determine a first AF based on other information instead of the mapping information when the message does not indicate use of the mapping information;
perform a first repetitive reception operation on the data transmitted from the transmitting node based on the first AF;
generate a reception response of the data when a number of receptions of the data is equal to the first AF;
inform the transmitting node of the reception response;
inform the transmitting node of information used for changing the first AF to a second AF; and
performing a second repetitive reception operation based on the second AF,
wherein the reception response means a reception failure when all results of all receptions of the data are failures, or the reception response means reception success when a result of at least one reception among all receptions of the data is successful, and the second AF is determined by the transmitting node based on the information used for changing the first AF to the second AF.

13. The receiving node according to claim 12, wherein the mapping information is a search space (SS)-AF mapping table, the first transmission parameter is one search space type in the SS-AF mapping table, and the control information is received in the one search space type.

14. The receiving node according to claim 12, wherein the mapping information is a radio network temporary identifier (RNTI)-AF mapping table, the first transmission parameter is one RNTI in the RNTI-AF mapping table, and the control information is scrambled by the one RNTI.

15. The receiving node according to claim 12, wherein the mapping information is received through at least one of a physical (PHY) message, a medium access control (MAC) message, and a radio resource control (RRC) message.

* * * * *